United States Patent
Sanchez

(10) Patent No.: US 8,290,153 B2
(45) Date of Patent: Oct. 16, 2012

(54) MANAGING A PLURALITY OF CACHED KEYS

(75) Inventor: Mauricio Sanchez, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 228 days.

(21) Appl. No.: 12/340,490

(22) Filed: Dec. 19, 2008

(65) Prior Publication Data

US 2009/0154695 A1    Jun. 18, 2009

Related U.S. Application Data

(62) Division of application No. 10/364,219, filed on Feb. 10, 2003, now Pat. No. 7,483,537.

(51) Int. Cl.
*G06F 21/00* (2006.01)

(52) U.S. Cl. ............................ 380/44; 380/30

(58) Field of Classification Search .............. 380/44, 380/30
See application file for complete search history.

(56) References Cited

U.S. PATENT DOCUMENTS

| | | | | |
|---|---|---|---|---|
| 4,924,515 A | * | 5/1990 | Matyas et al. | 380/280 |
| 5,278,905 A | * | 1/1994 | McNair | 380/44 |
| 5,613,784 A | * | 3/1997 | Ohashi | 400/76 |
| 5,781,458 A | * | 7/1998 | Gilley | 708/255 |
| 5,793,657 A | * | 8/1998 | Nemoto | 708/402 |
| 5,930,362 A | * | 7/1999 | Daly et al. | 380/277 |
| 6,091,819 A | | 7/2000 | Venkatesan et al. | |
| 6,195,669 B1 | * | 2/2001 | Onodera et al. | 708/3 |
| 6,307,936 B1 | * | 10/2001 | Ober et al. | 380/30 |
| 6,772,954 B2 | | 8/2004 | Boyer et al. | |
| 7,003,664 B2 | * | 2/2006 | Kori | 713/165 |
| 7,016,494 B2 | * | 3/2006 | Hopkins et al. | 380/44 |
| 7,149,309 B1 | * | 12/2006 | Silver | 380/229 |
| 2002/0015497 A1 | | 2/2002 | Maruyama et al. | |
| 2002/0108042 A1 | | 8/2002 | Oka et al. | |
| 2002/0114470 A1 | | 8/2002 | Mauro, II et al. | |
| 2002/0161957 A1 | | 10/2002 | Comeau et al. | |
| 2003/0021419 A1 | * | 1/2003 | Hansen et al. | 380/277 |

FOREIGN PATENT DOCUMENTS

| | | | |
|---|---|---|---|
| EP | 1085393 A2 | * | 3/2001 |
| JP | 60095475 A | * | 5/1985 |
| JP | 04134677 A | * | 5/1992 |

* cited by examiner

*Primary Examiner* — Michael Pyzocha

(57) ABSTRACT

In a method of managing a plurality of cached keys, a determination is made as to whether to generate an additional key for the plurality of cached keys. If it is determined to generate the additional key, control of a central processing unit is acquired and a first current time is recorded. While a difference between a second current time and the first current time is not greater than a predefined time slice, one or more operational units of a plurality of operational units for generating the additional key are executed on the central processing unit. If the additional key is completed, the additional key is saved as a cached key with the plurality of cached keys.

11 Claims, 5 Drawing Sheets

MANAGING A PLURALITY OF CACHED KEYS

CROSS REFERENCE TO RELATED APPLICATIONS

This application claims priority and is a divisional of Ser. No. 10/364,219, now U.S. Pat. No. 7,483,537, entitled "Selecting Cached RSA Keys in Response to RSA Key Requests," with filing date Feb. 10, 2003, and assigned to the assignee of the present invention, the disclosure of which is hereby incorporated herein by reference.

BACKGROUND OF THE INVENTION

1. Field of the Invention

The present invention generally relates to responding to cryptographic key requests. More particularly, the present invention relates to selecting cached keys in response to key requests.

2. Related Art

Cryptography is widely used for a variety of security applications. These security applications include encryption and decryption. Encryption is the transformation of data into a form that is close to impossible as possible to read without the appropriate knowledge (a key). Its purpose is to ensure privacy by keeping information hidden from anyone for whom it is not intended, even those who have access to the encrypted data. Decryption is the reverse of encryption. It is the transformation of encrypted data back into an intelligible form. Both encryption and decryption generally require the use of secret information, referred to as a key.

RSA is a public-key cryptosystem. RSA is characterized by the RSA key. The RSA key is comprised of a pair of keys. The pair of keys includes a public key and a private key. The RSA public-key cryptosystem can be used in protocols, such as SSL (Secure Socket Layer) and SSH (Secure Shell), which permit computer systems to securely communicate over a network.

Typically, the size (or length in bits) of the RSA key depends on the security needs of the particular application. The larger the size of the RSA key, the greater the security, but also the longer it takes to generate the RSA key.

FIG. 1 illustrates response to a request for a RSA key of x-bits in accordance with the prior art. As illustrated in FIG. 1, at 10 a request for a RSA key of x-bits is received, whereas x is, for example, 512, 768, or 1024. Other values for x are possible. At 20, a key generator generates the RSA key of x-bits in real-time by using a CPU (central processing unit). Moreover, at 30 the RSA key of x-bits is provided in response to the request for a RSA key of x-bits.

Generation of the RSA key is a CPU-intensive task. Typically, due to cost concerns, CPUs in a variety of systems are not designed with sufficient computational power to generate the RSA key in real-time without degrading system performance. Thus, the CPU may be occupied with generating the RSA key for seconds or even minutes to the detriment of other resources demanding use of the CPU. For example, a certain CPU may take 20 seconds to generate a 512-bit RSA key, may take 45 seconds to generate a 768-bit RSA key, and may take 90 seconds to generate a 1024-bit RSA key.

Furthermore, these cost-conscious systems usually rely on simple co-operative multitasking operating systems, which rely on processes to decide when to relinquish the CPU. Consuming the CPU for long times necessary to generate RSA keys in most cases is prohibited. While use of a preemptive operating system is a solution, it introduces complexities and problems into the system that may outweigh its benefits.

SUMMARY OF THE INVENTION

A method of responding to a request for a key of a first length is provided. According to the method, the request for the key of the first length is received. Moreover, it is determined whether any one of a plurality of cached keys satisfies the request. If any one of the plurality of cached keys satisfies the request, a cached key of the first length is selected. Also, the selected cached key is removed from the plurality of cached keys. Thus, in response to the request, the selected cached key of the first length is provided.

BRIEF DESCRIPTION OF THE DRAWINGS

The accompanying drawings, which are incorporated in and form a part of this specification, illustrate embodiments of the invention and, together with the description, serve to explain the principles of the present invention.

DETAILED DESCRIPTION OF THE INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Although the following description of the present invention will focus on RSA keys, it should be understood that the present invention is applicable to other types of keys.

Figure 1:
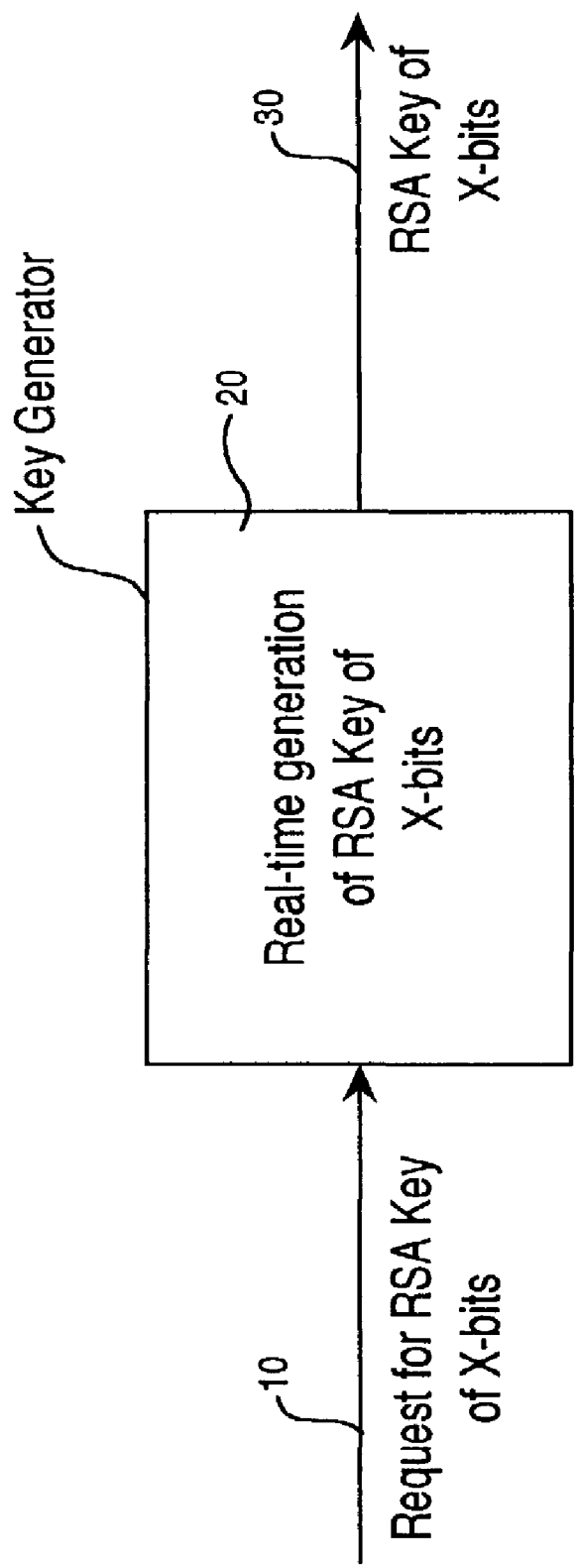
FIG. 1 illustrates response to a request for a RSA key of x-bits in accordance with the prior art.
Figure 2:
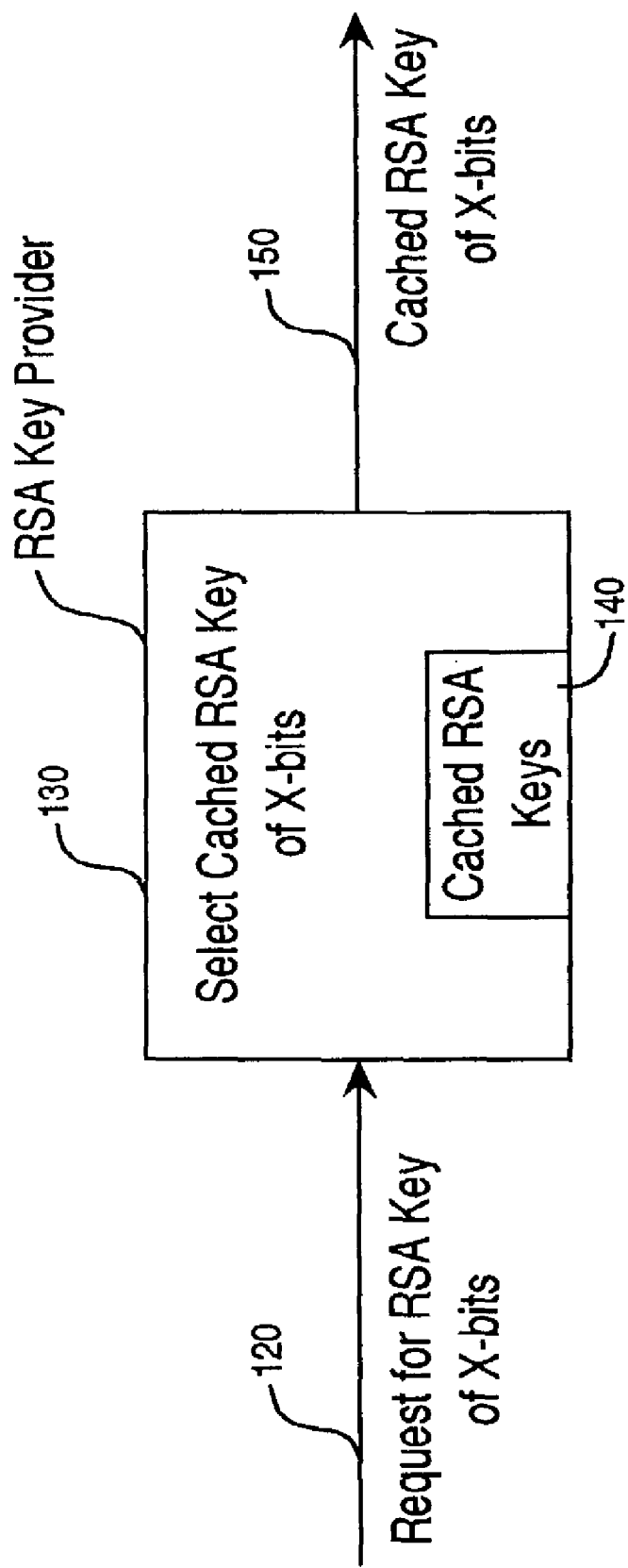
FIG. 2 illustrates response to a request for a RSA key of x-bits in accordance with an embodiment of the present invention.

FIG. 2 illustrates response to a request for a RSA key of x-bits in accordance with an embodiment of the present invention. As illustrated in FIG. 2, at 120 a request for a RSA key of x-bits is received, whereas x is, for example, 512, 768, or 1024. Other values for x are possible.

At 130, the RSA key provider of the present invention selects a cached RSA key of x-bits from a plurality of cached RSA keys 140 and removes the selected cached RSA key of x-bits from the plurality of cached RSA keys 140 to avoid reusing the same cached RSA key of x-bits. The plurality of cached RSA keys 140 can have multiple groups of cached RSA keys, whereas each group represents a different length in bits for the cached RSA key within the group. For example, the plurality of cached RSA keys 140 may include a first group of cached RSA keys of 512-bits, a second group of cached RSA keys of 768-bits, and a third group of cached RSA keys of 1024-bits. Other groups are possible.

Additionally, a value can be associated with each group, whereas the value represents a maximum total number of cached RSA keys of a particular length in the group. Each value is a configuration parameter of each group and is adjustable. Here, a cached RSA key of x-bits refers to a RSA key of x-bits that has been generated prior to receiving the request for the RSA key of x-bits and that has been stored in anticipation of receiving a request for the RSA key of x-bits. The number of groups of cached RSA keys and the value associated with each group are design choices that take into account the protocols or standards of the particular application, the demand for RSA keys, and the capacity of a central processing unit (CPU) of a system used to generate the RSA keys.

Since generation of an RSA key typically requires as input the length in bits and an exponent value that is static, generation of the RSA key prior to receiving the request for the RSA key does not compromise the security feature of the RSA key. The RSA key is well suited for generation prior to receiving the request for the RSA key.

Since the request for the RSA key of x-bits is selected from the plurality of cached RSA keys 140, the CPU does not have to be used to generate the RSA key in real-time as is done in the prior art. As discussed earlier, the computational capacity of the CPU may not allow real-time generation of the RSA key within a reasonable amount of time that does not affect overall system performance. Thus, the cached RSA keys provide a buffer to mitigate the affects that generation of RSA keys in real-time would have on the system due to a slow CPU. By storing the cached RSA keys, the wait time when a request for a RSA key is received is very short, potentially near zero since the RSA key has already been generated and stored prior to receiving the request for the RSA key.

Moreover, at 150 the RSA key of x-bits is provided in response to the request for a RSA key of x-bits.

Figure 3:
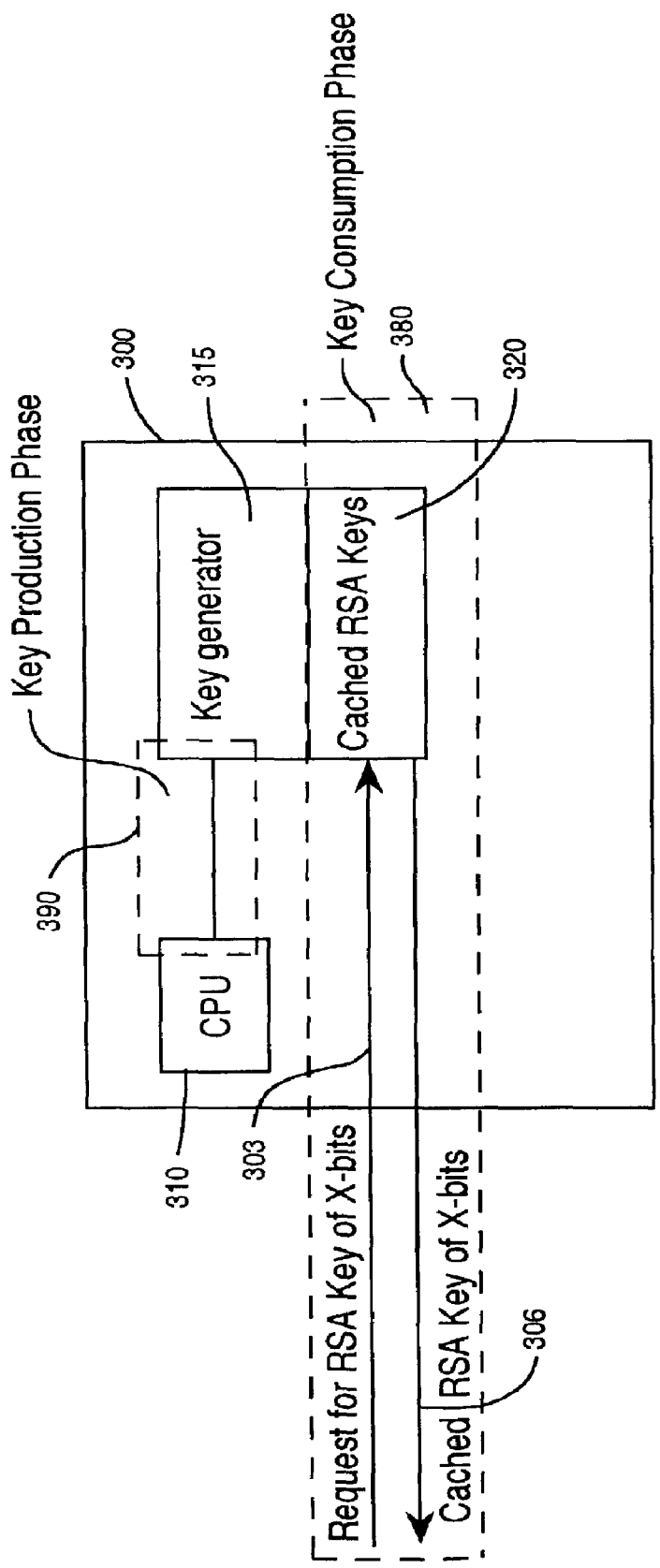
FIG. 3 illustrates a system for responding to a request for a RSA key of x-bits in accordance with an embodiment of the present invention, showing a key consumption phase and a key production phase.

FIG. 3 illustrates a system 300 for responding to a request 303 for a RSA key of x-bits in accordance with an embodiment of the present invention, showing a key consumption phase 380 and a key production phase 390.

As illustrated in FIG. 3, the system 300 includes a storage unit 320 for storing a plurality of cached RSA keys and for responding to the request 303 for the RSA key of x-bits. In response to the request 303 for the RSA key of x-bits, during the key consumption phase 380 the storage unit 320 determines whether any one of the plurality of cached RSA keys satisfies the request 303. Moreover, if any one of the plurality of cached RSA keys satisfies the request 303, the storage unit 320 selects a cached RSA key of x-bits and removes the selected cached RSA key from the plurality of cached RSA keys. Then, the storage unit 320 provides the selected cached RSA key of x-bits at 306.

Additionally, the system 300 includes a central processing unit (CPU) 310 and a key generator 315 for interacting with the CPU to generate RSA keys for the plurality of cached RSA keys to enable response to future requests for an RSA keys. In an embodiment, the key generator 315 is implemented in software. During the key production phase 390, the key generator 315 interacts with the CPU 310 to generate the RSA keys for the plurality of cached RSA keys in a self-check time slice manner. The number of groups of cached RSA keys and the value associated with each group described above determine the workload of the key generator 315 and the CPU 310 to prepare for future requests for RSA keys.

Generation of the RSA keys is done in such a manner that overall system performance and response is not perceivably degraded. In particular, the self-check time slice process for generating the RSA keys relinquishes control of the CPU 310 after a predefined amount of time, which is adjustable, to avoid dominating the CPU 310 at the expense of other resources requiring access to the CPU 310. This ensures that even if the system 300 has an operating system that is non-preemptive, generation of the RSA keys will not perceivably inflict system degradation caused by domination of the CPU 310. In an embodiment, generation of the RSA key is assigned a low priority with respect to accessing the CPU 310. As a result, generation of the RSA key typically proceeds when the CPU 310 is idle or free.

Figure 4:
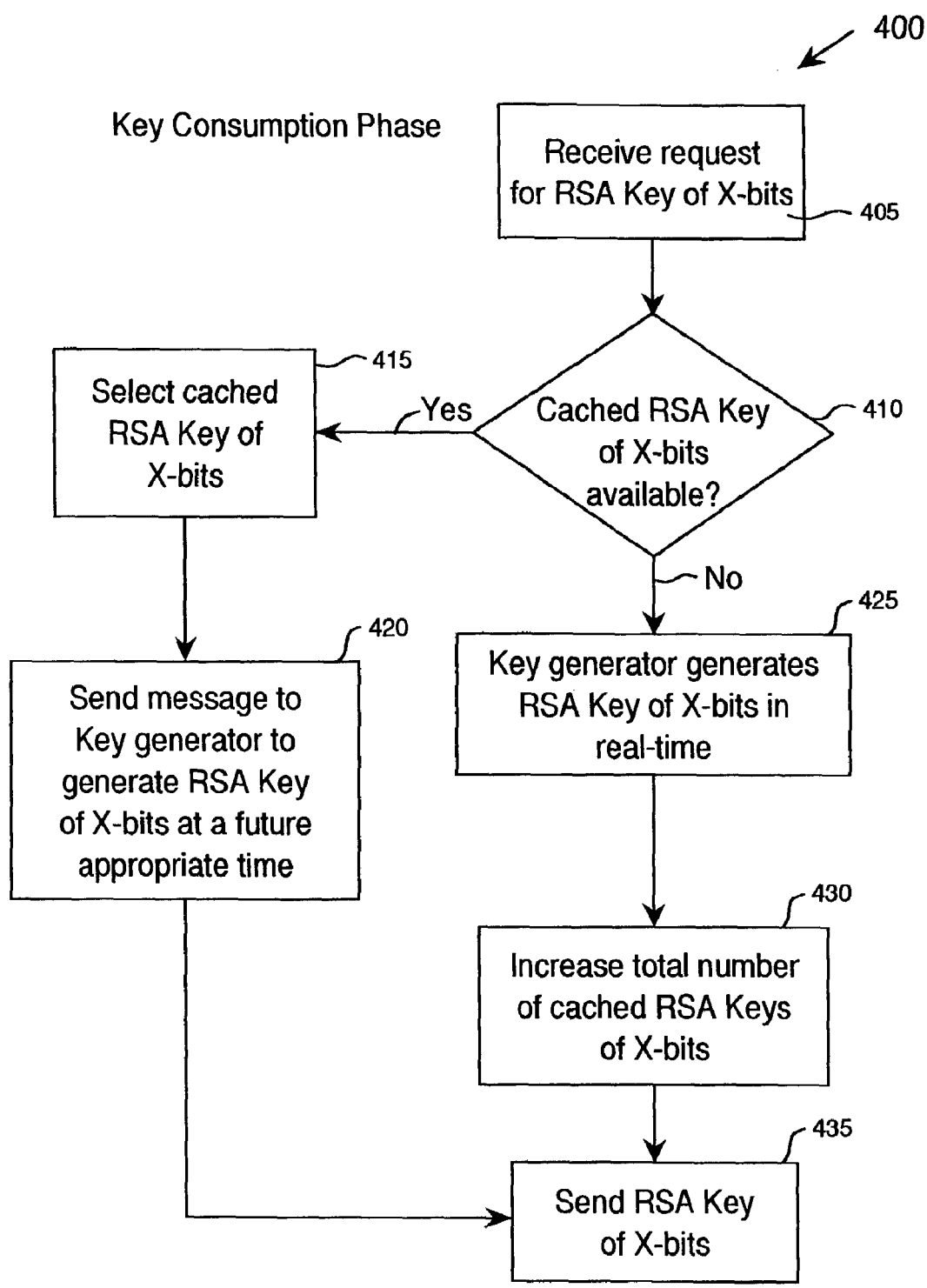
FIG. 4 illustrates a flow chart showing a method of implementing the key consumption phase of FIG. 3 in accordance with an embodiment of the present invention.

FIG. 4 illustrates a flow chart showing a method 400 of implementing the key consumption phase 380 of FIG. 3 in accordance with an embodiment of the present invention.

At step 405, a request for a RSA key of x-bits is received, whereas x is, for example, 512, 768, or 1024. Other values for x are possible. At step 410, it is determined whether any of the plurality of cached RSA keys satisfies the request for the RSA key of x-bits. If any one of the plurality of cached RSA keys satisfies the request, the method 400 continues to step 415. Otherwise, the method 400 proceeds to step 425. The plurality of cached RSA keys can have multiple groups of cached RSA keys, whereas each group represents a different length in bits for the cached RSA key within the group. For example, the plurality of cached RSA keys may include a first group of cached RSA keys of 512-bits, a second group of cached RSA keys of 768-bits, and a third group of cached RSA keys of 1024-bits. Other groups are possible. Additionally, a value can be associated with each group, whereas the value represents a maximum total number of cached RSA keys of a particular length in the group.

Continuing at step 415, if any one of the plurality of cached RSA keys satisfies the request for the RSA key of x-bits, a cached RSA key of x-bits is selected and removed from the plurality of cached RSA keys.

Furthermore, at step 420, a message is sent to the key generator 315 to generate a replacement RSA key of x-bits to replace the selected cached RSA key for the plurality of cached RSA keys at a future appropriate time. For example, when the CPU 310 is idle or free, the replacement RSA key may be generated.

At step 435, the selected cached RSA key of x-bits is provided in response to the request for the RSA key of x-bits.

Continuing at step 425, if none of the plurality of cached RSA keys satisfies the request for the RSA key of x-bits, the key generator 315 and the CPU 310 generate the RSA key of x-bits in real-time. This situation can occur if the buffer provided by the plurality of cached RSA keys is insufficient because (1) the cached RSA keys are consumed faster than the key generator 315 and the CPU 310 replaces them or (2) the key generator 315 and the CPU 310 fail to generate RSA keys of the appropriate length.

At step 430, the buffer provided by the plurality of cached RSA keys is adjusted. In particular, the value representing the maximum total number of cached RSA keys of x-bits in a particular group is increment to enlarge the buffer. Moreover, at step 435, the RSA key of x-bits that is generated in real-time is provided in response to the request for the RSA key of x-bits.

Figure 5:
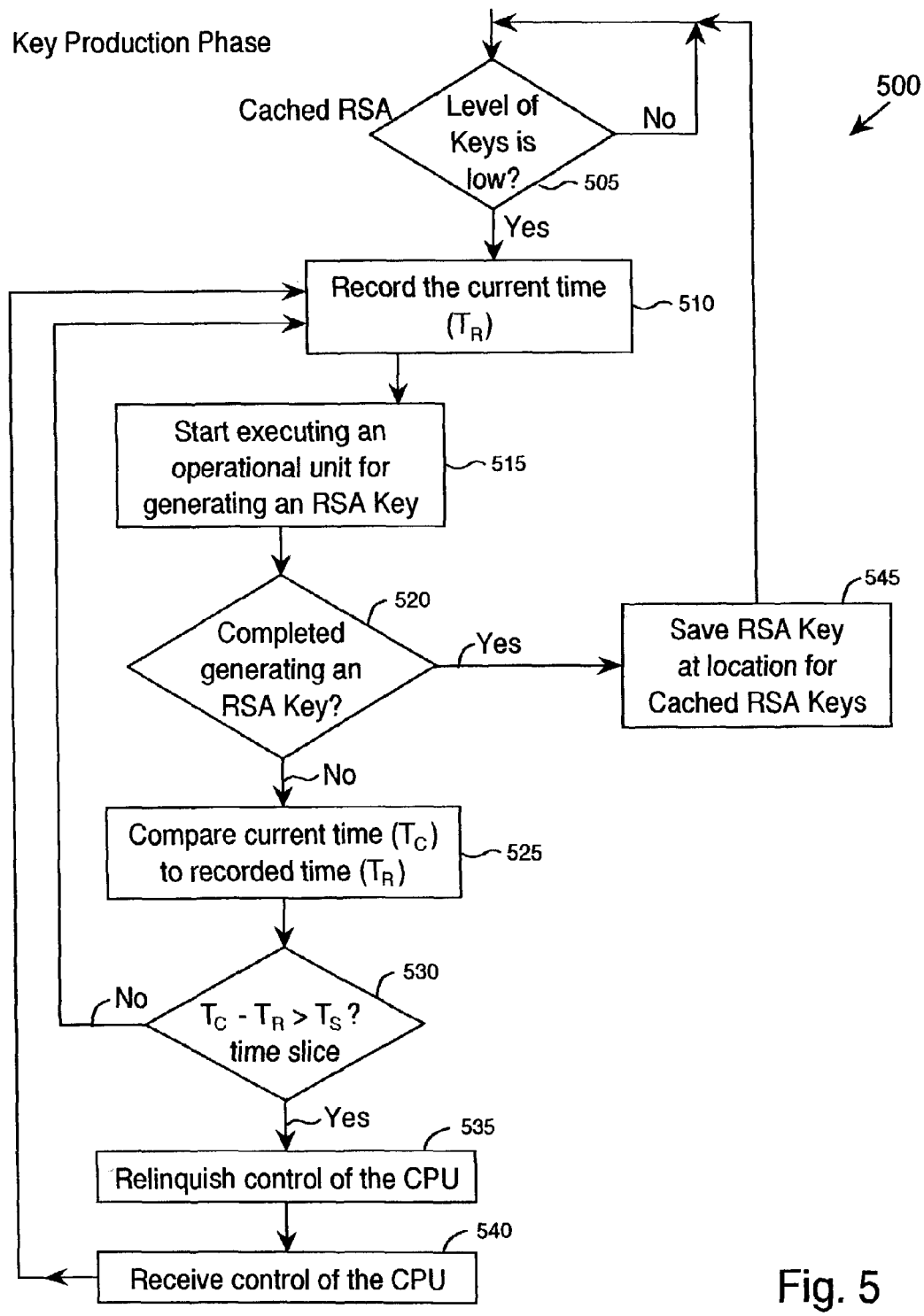
FIG. 5 illustrates a flow chart showing a method of implementing the key production phase of FIG. 3 in accordance with an embodiment of the present invention.

FIG. 5 illustrates a flow chart showing a method of implementing the key production phase 390 of FIG. 3 in accordance with an embodiment of the present invention. It should be understood that the operating system of the system 300 of FIG. 3 can be non-preemptive, preemptive, or any other type.

At step 505, the key generator 315 determines whether to generate a RSA key of x-bits to store with the plurality of cached RSA keys. For example, the key generator may receive a message to generate a replacement RSA key of x-bits to replace the selected cached RSA key of x-bits for the plurality of cached RSA keys at a future appropriate time. Moreover, at start-up of the system 300, the key generator 315 may receive a message to generate RSA keys to store as cached RSA keys for future requests for RSA keys. Additionally, the key generator 315 may check whether the actual number of cached RSA keys in each group is below the level provided by the value associated with each group, whereas the value is a configuration parameter of each group. If the key generator 315 decides to generate a RSA key for the plurality of cached RSA keys, the method 500 proceeds to step 510. Otherwise, the key generator 315 waits.

Continuing at step 510, the key generator 315 acquires control of the CPU 310 and records a first current time ($T_R$).

Moreover, at step 515, key generator 315 interacts with the CPU 310 to execute an operational unit of a plurality of operational units, whereas execution of the operational units generates the RSA key. In particular, each operational unit represents a sub-division of the computational tasks required to generate the RSA key. Each operational unit can be executed individually.

At step 520, it is determined whether the RSA key is completed. If the RSA key is completed, the method proceeds to step 545. If the RSA key is not completed, the method proceeds to step 525.

Furthermore, at step 545, if the RSA key is completed, the RSA key is saved and stored with the plurality of cached RSA keys. Then, the method 500 proceeds to step 505 again.

If the RSA key is not completed, the method proceeds to step 525. At step 525, a second current time ($T_C$) is compared with the first current time ($T_R$) that was recorded earlier.

Continuing at step 530, it is determined whether the difference between the second current time ($T_C$) and the first current time ($T_R$) is greater than a predefined time slice ($T_S$), whereas the predefined time slice ($T_S$) prevents domination of the CPU 310 for generation of the RSA key and is adjustable. If it is determined that the difference between the second current time ($T_C$) and the first current time ($T_R$) is greater than the predefined time slice ($T_S$), the method 500 proceeds to step 535. If it is determined that the difference between the second current time ($T_C$) and the first current time ($T_R$) is greater than the predefined time slice ($T_S$), the method 500 proceeds to step 510 so that another operational unit can be executed at step 515 as described above.

At step 535, if it is determined that the difference between the second current time ($T_C$) and the first current time ($T_R$) is greater than the predefined time slice ($T_S$), the key generator 315 relinquishes control of the CPU 310 so that other resources can access the CPU 310.

At step 540, the key generator receives control of the CPU 310 again. In an embodiment, generation of the RSA key is assigned a low priority with respect to accessing the CPU 310. For example, when the CPU 310 is idle or free, the method 500 may continue with generation of RSA keys by proceeding to step 510 so that another operational unit can be executed at step 515 as described above.

In sum, the present invention utilizes cached RSA keys to help mitigate the effects of a slow CPU when responding to requests for RSA keys. Moreover, even if the RSA keys are generated on a system having a non-preemptive operating system, the self-check time slice manner of generating RSA keys enables generation of RSA keys without perceivable system performance degradation.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of managing a plurality of keys, said method comprising:
    determining that an additional key is to be generated for a plurality of cached keys when a number of cached keys is below a predetermined value;
    acquiring control of a central processing unit and recording a first current time;
    starting generation of the additional key through control of the central processing unit;
    determining whether the additional key is complete;
    upon determining that the additional key is complete, saving the additional key as a cached key with the plurality of cached keys;
    upon determining that the additional key is not complete:
        calculating a difference between a second current time and said first current time;
        while the difference is not greater than a predefined time slice, continuing to generate the additional key; and
        when the difference between the second current time and the first current time is greater than the predefined time slice, relinquishing control of the central processing unit to cease generation of the additional key.

2. The method as recited in claim 1 wherein said predefined time slice is adjustable.

3. The method as recited in claim 1 wherein each cached key is one of a plurality of lengths.

4. The method as recited in claim 3 wherein said plurality of lengths includes a first length, wherein said first length is one of 512 bits, 768 bits and 1024 bits.

5. The method as recited in claim 1 wherein each cached key is a RSA key.

6. The method as recited in claim 1, further comprising checking whether a number of cached keys in the plurality of cached keys is below a predetermined value in determining that the additional key is to be generated.

7. The method as recited in claim 1, wherein the plurality of cached keys comprises groups of keys, said method further comprising checking whether a number of cached keys in each of the groups of keys is below a predetermined value associated with each group of keys in determining that the additional key is to be generated.

8. The method as recited in claim 1, further comprising:
    receiving control again of said central processing unit following relinquishing of control;
    recording a new first current time; and
    while a difference between a new second current time and said new first current time is not greater than said predefined time slice, continuing generation of said additional key through control of the central processing unit.

9. A non-transitory computer readable storage medium on which is embedded a computer program, said computer program that when executed by a processor, implementing a method for managing a plurality of keys, said computer program comprising computer readable code to:
- determine that an additional key is to be generated for a plurality of cached keys when a number of cached keys is below a predetermined value;
- acquire control of a central processing unit and recording a first current time;
- start generation of the additional key through control of the central processing unit;
- determine whether the additional key is complete;
- upon a determination that the additional key is complete, save the additional key as a cached key with the plurality of cached keys;
- upon a determination that the additional key is not complete:
  - calculate a difference between a second current time and said first current time;
  - while the difference is not greater than a predefined time slice, continue to generate said additional key; and
  - when the difference between the second current time and the first current time is greater than the predefined time slice, relinquishing control of the central processing unit to cease generation of the additional key.

10. The non-transitory computer readable storage medium of claim 9, said computer program comprising computer readable code to:
- when said difference between said second current time and said first current time is greater than said predefined time slice, relinquish control of said central processing unit to cease generation of the additional key.

11. The non-transitory computer readable storage medium of claim 10, said computer program comprising computer readable code to:
- receive control again of said central processing unit;
- record a new first current time; and
- while a difference between a new second current time and said new first current time is not greater than said predefined time slice, continue generation of said additional key through control of the central processing unit.

* * * * *